United States Patent [19]

Suzuki et al.

[11] Patent Number: 4,527,153
[45] Date of Patent: Jul. 2, 1985

[54] DETECTABLE ELEMENT AND SENSOR

[75] Inventors: Kenichi Suzuki, Isehara; Kazunari Yamada, Atsugi, both of Japan

[73] Assignee: Kazunari Yamada, Kanagawa, Japan

[21] Appl. No.: 402,013

[22] Filed: Jul. 26, 1982

[30] Foreign Application Priority Data

Aug. 18, 1981 [JP] Japan .................. 56-129514

[51] Int. Cl.³ ........................................... G08B 13/24
[52] U.S. Cl. ........................ 340/572; 73/654
[58] Field of Search ............... 340/541, 551, 572; 73/649, 652, 654

[56] References Cited

U.S. PATENT DOCUMENTS 3,754,225  8/1973  Gleason .................................. 340/572

Primary Examiner—Jerry W. Myracle
Attorney, Agent, or Firm—Pollock, Vande Sande and Priddy

[57] ABSTRACT

A detectable element is attached to an object for detecting the presence or passage of the object and comprises a capsule and a permanent magnet rotatably and vibratably mounted in the capsule. When the detectable element enters an alternating magnetic field, the permanent magnet rotates or vibrates within the capsule to thereby produce a magnetic wave or an audible sound, which is picked up to detect the detectable element.

10 Claims, 22 Drawing Figures

DETECTABLE ELEMENT AND SENSOR

BACKGROUND OF THE INVENTION

The present invention relates to a detectable element for enabling a detector to detect the passage or presence of an object to which the detectable element is attached.

There has been proposed a detectable element which comprises a small permanent magnet that can be attached to an object to be detected. When the object with such a permanent magnet attached reaches a certain location, the magnetic flux emanating from the permanent magnet is detected by a detector so that arrival of the object at the location or passage thereof through the location can be ascertained. Such detectable elements have found a wide variety of applications. For example, the detectable elements are applied to goods displayed for sale in a retail store. When someone who has shoplifted one or more of such goods walks through an entrance or exit of the store, they can immediately be detected by a detector installed at the entrance and exit.

The detectable elements for such crime-prevention use are required to be extremely small in size since, when attached to goods, they should go unnoticed. The small-size detectable elements generally produce a relatively weak magnetic field. Products of iron which are normally present around us retain some degree of residual magnetism. The detector therefore frequently fail to clearly distinguish goods to which the detectable elements are attached from those products of iron with such residual magnetism which happen to approach or pass by the detector. External magnetic noise generated by nearby vehicles also seriously affects the detector, which then becomes unable to detect detectable elements properly.

SUMMARY OF THE INVENTION

It is an object of the present invention to provide a detectable element which is small in size, less costly to construct, and can reliably be detected.

Another object of the present invention is to provide a detectable element which can be detected at a relatively long distance without being seriously affected by external magnetic noise.

According to the present invention, a detectable element comprises a permanent magnet and means for mounting the permanent magnet on an object to be detected for its presence or passage, the permanent magnet being rotatably and vibratably supported by the mounting means. The mounting means may, for example, comprise a capsule housing therein the permanent magnet, which may be in the form of a ball. The internal volume of the capsule is greater than the volume of the permanent magnet so that the permanent magnet can freely rotate or vibrate within the capsule. The detectable element is attached to the object to be detected. A space in which detection should be carried out is filled with an alternating magnetic field by a first magnetic field generating means. When the object bearing the detectable element is in the space or passes through the space, the permanent magnet is moved under the alternating magnetic field to generate a magnetic wave. The magnetic wave thus generated is detected by a magnetic field sensor, which provides an output to drive a visible or audible indicator to announce the presence or passage of the object. A second magnetic field generating means should preferably be added to produce an auxiliary alternating magnetic field in synchronism with the first magnetic field generating means for cancelling out the alternating magnetic field present at the magnetic field sensor. A filter is included for picking up only signal components from the magnetic field sensor while removing noise components. The detectable element may be constructed to produce a sound when the permanent magnet is moved in response to the applied alternating magnetic field, and the sound generated may be picked up by a microphone which then produces an output for driving the indicator.

The above and other objects, features and advantages of the present invention will become more apparent from the following description when taken in conjunction with the accompanying drawings in which certain preferred embodiments of the present invention are shown by way of illustrative example.

DESCRIPTION OF THE PREFERRED EMBODIMENTS

Figure 1:
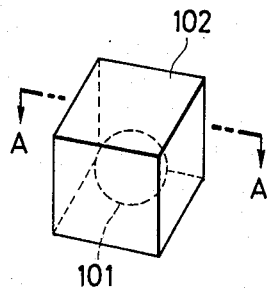
FIG. 1 is a perspective view of a detectable element according to the present invention.
Figure 2:
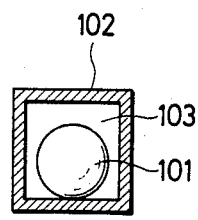
FIG. 2 is a cross-sectional view taken along line A—A of FIG. 1.
Figure 3:
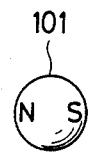
FIG. 3 is a front elevational view of a permanent magnet incorporated in the detectable element shown in FIG. 1.

As shown in FIGS. 1 and 2, a detectable element according to an embodiment of the present invention includes a permanent magnet 101 housed in a nonmagnetic capsule 102 as of synthetic resin in the shape of a hollow box with a space 103 left between the permanent magnet 101 and the walls of the capsule 102. The permanent magnet 101 is in the form of a ball having a diameter of about 3 mm, and is rotatable and vibratable within the capsule 102 which has an internal volume of $5 \times 5 \times 5$ mm$^3$, for example. As shown in FIG. 3, the permanent magnet 101 is magnetized such that its lefthand half is of a north-seeking pole while the righthand half is of a south-seeking pole. The detectable element 101 is attached to an object to be detected. When the object enters a space in which an alternating magnetic field having a frequency f is produced, the permanent magnet 101 is driven by such an alternating magnetic field to rotate or vibrate. Experiments indicate that where the frequency f is 50 Hz, the permanent magnet 101 rotates or vibrates in synchronism with the alternating magnetic field at a frequency of f/2, f/3, or f/4. When the permanent magnet 101 thus moves, it produces a magnetic wave having such a frequency or a frequency close thereto. When the frequency f is higher than a certain frequency, then the permanent magnet 101 rotates or vibrates at a frequency which is not equal to the frequency f but to the frequency of f/2, f/3 or f/an integral number, because of inertia of the permanent magnet 101 due to its mass or friction thereof with the capsule 102 due to its vibration. The magnetic wave that the permanent magnet 101 produces upon rotation or vibration is detected by a known high-sensitivity magnetic field sensor. It is experimentally determined that disturbance magnetic waves caused by iron products or vehicles passing by the magnetic field sensor generally have a frequency on the order of or below 1 Hz. Therefore, the magnetic field sensor can easily differentiate magnetic waves the permanent magnet 101 generates in the ranges of frequencies related to the frequency f from such disturbance magnetic waves.

Figure 4:
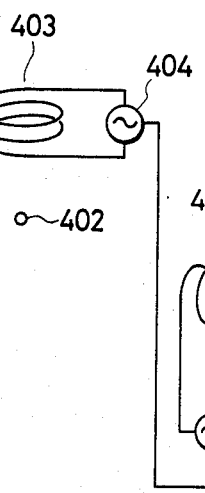
FIG. 4 is a block diagram of a circuit for magnetically detecting the detecting element of the present invention.

FIG. 4 shows a detector device for detecting the passage or presence of the magnetically detectable element as described above. The detector device includes a high-sensitivity magnetic field sensor 401 which may comprise a fluxgate magnetometer, a proton-precision magnetometer, a magnetic multi-type magnetometer, an SQUID magnetometer, an optical pumping magnetometer, a magnetometer having a stationary solenoid coil, a magnetometer having a rotating or vibrating magnetic path or coil, or a magnetic-flux-density sensor such as a Hall-effect device, a magneto-resistive device or a magnetic diode. The detector device has a coil 403 located in the vicinity of a location 402 for detecting the passage of an object that carries the detectable element as illustrated in FIG. 1. The coil 403 is supplied with an alternating current of a frequency of f from an AC power supply 404 to generate an alternating magnetic field of the frequency f in a space around the location 402. When the object with the detectable element passes through the location 402, the permanent magnet 101 is actuated as described above due to the alternating magnetic field produced by the coil 403 thereby to create magnetic waves having a frequency of f/2, f/3, f/4 or f/an integer, or a frequency close thereto. The magnetic field sensor 401 detects such magnetic waves and converts them into an electric signal. The magnetic field sensor 401 is also subjected to an alternating magnetic field having the frequency f which is produced by the current of the frequency f flowing through the coil 403. Since such an alternating magnetic field is quite intensive as compared with the magnetic field generated by the motion of the permanent magnet 101, the magnetic field sensor 401 or an amplifier 405 for amplifying an output therefrom tends to be saturated, resulting in a measurement failure. To cope with this difficulty, an auxiliary coil 406 is disposed adjacent to the magnetic field sensor 401. The auxiliary coil 406 is supplied with an alternating current of a frequency f from a power supply 407 to produce an alternating magnetic field. The location and shape of the auxiliary coil 406, and the magnitude of the current supplied thereto are selected such that the magnetic field generated by the coil 403 and existing at the sensor 401 will be cancelled out by the magnetic field produced by the auxiliary coil 406. The auxiliary coil 406 may be positioned closely to the sensor 401, or wound around the sensor 401 to allow the magnetic field from the auxiliary coil 406 to act intensively on the sensor 401 but fail to significantly affect other parts of the detector device. As a result, the alternating magnetic field of the frequency f at the location 402 comes substantially solely from the coil 403.

The sensor 401 is subjected to the magnetic field caused by the permanent magnet 101 in a frequency range having the frequencies f/2, f/3 and the like, the disturbance magnetic field mainly of the frequencies around 1 Hz, and the earth magnetic field. The amplifier 405 is connected at its output with a filter 408 having frequency characteristics selected to allow passage only of signal components of the above frequency range, but reject signal components due to the disturbance magnetic field and the DC magnetic field. The filter 408 produces an output signal which energizes an indicator 409 for producing a visible or audible output. Thus, the detector device shown in FIG. 4 can detect the passage or presence of the object with the detectable element of FIG. 1 at the location 402 without being adversely affected by the disturbance magnetic field and the earth magnetic field which act on the detector device. The amplifier 405 may be followed by a known notch filter 410 as shown by the dotted line in FIG. 4 for rejecting a signal having the frequency f. Such a notch filter 410 serves to compensate for any degree of failure for the auxiliary coil 406 to cancel out the magnetic field generated by the coil 403. Where the saturation level of the sensor 401 and the amplifier 405 is sufficiently high, the notch filter 410 alone suffices and the auxiliary coil 406 and its power supply 407 may be dispensed with. While the central axis of the coil 403 is shown as extending in orthogonal relation to the central axis of the auxiliary coil 406 and sensor 401, these central axes may extend parallel to each other or at an angle to each other. The detector device may include a plurality of coils 403.

Figure 5:
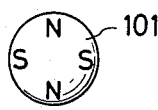
FIG. 5 is a front elevational view of a permanent magnet having four magnetic poles.
Figure 6:
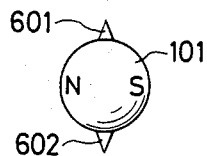
FIG. 6 is a front elevational view of a permanent magnet having a pair of projections jointly serving as a rotational shaft.

As shown in FIG. 5, a ball-shaped permanent magnet 101 according to another embodiment has four magnetic poles angularly spaced at 90-degree intervals around the center of the permanent magnet 101. The permanent magnet 101 may be magnetized to have more magnetic poles than four magnetic poles. FIG. 6 illustrates a spherical permanent magnet 101 having two diametrically opposite magnetic poles and a pair of projections 601, 602 positioned in diametrically opposite relation between the magnetic poles and serving as a rotational shaft about which the spherical permanent magnet 101 is rotatable within the capsule 102 as shown in FIG. 1. The permanent magnet 101 with such projections 601, 602 may also be provided with a multiplicity of magnetic poles more than two magnetic poles. Where more than two magnetic poles are present, the magnetic wave generated by the permanent magnet 101 has a higher frequency, and the filter 408 is required to have a corresponding frequency band to pass such a higher frequency.

Figure 7:
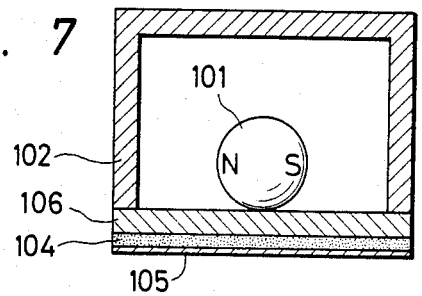
FIG. 7 is a cross-sectional view of a detectable element having an adhesive layer.

FIG. 7 shows a detectable element according to still another embodiment, in which a box-shaped capsule 102 containing therein the permanent magnet 101 as shown in FIG. 1 has on one side thereof an adhesive layer 104 and a peelable layer 105 attached to an outer surface of the adhesive layer 104. When the detectable element is to be applied to an object, the peelable layer 105 is first peeled off, and then the adhesive layer 104 is pressed against the object. The adhesive layer 104 should preferably be attached to a cover 106 through which the permanent magnet 101 can be brought into the capsule 102. The capsule 102 is fabricated of a box-shaped member with one side open and such a cover 106 with the adhesive layer 104 and peelable layer 105 placed thereon, the cover 106 being bonded, fused or otherwise fixed to the box-shaped member. The cover 106 can be prepared in quantities by being cut out of a sheet having adhesive and peelable layers mounted thereon.

Figure 8:
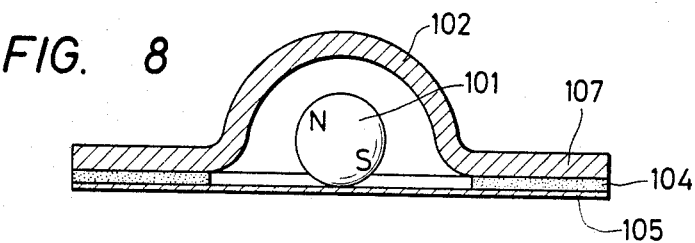
FIG. 8 is a cross-sectional view of a detectable element having a hat-shaped capsule.
Figure 9:
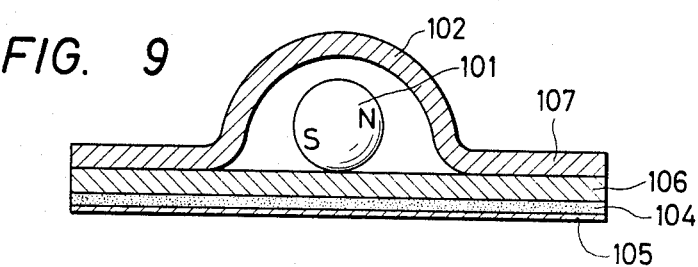
FIG. 9 is a cross-sectional view of a detectable element which is a modification of the detectable element shown in FIG. 8.
Figure 10:
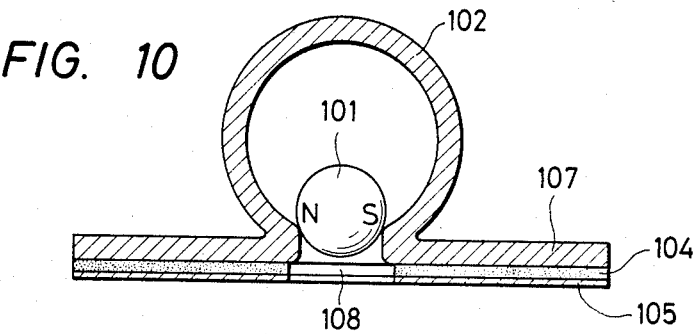
FIG. 10 is a cross-sectional view of a detectable element having a pot-shaped capsule.

As illustrated in FIG. 8, a capsule 102 may be in the shape of a hat including a flange 107 with an adhesive layer 104 and a peelable layer 105 thereon. For attachment to an object, the peelable layer 105 is peeled and the adhesive layer 104 is stuck to the object. The permanent magnet 101 is disposed in a space defined between the hat-shaped capsule 102 and the object. According to an embodiment shown in FIG. 9, a cover 106 is attached to a hat-shaped capsule 102 and supports thereon an adhesive layer 104 and a peelable layer 105. In FIG. 10, a capsule 102 is made of a flexible material and has a constricted opening 103 having a diameter which is slightly smaller than that of the permanent magnet 101. The permanent magnet 101 is forcibly pushed into the capsule 102 through the opening 108. The capsule 102 has a flange 107 on which an adhesive layer 104 is placed.

Figure 11:
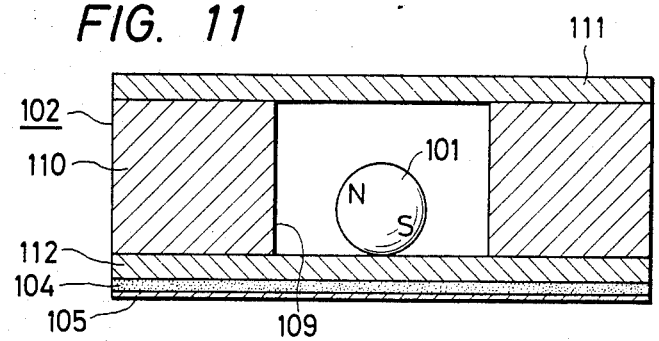
FIG. 11 is a cross-sectional view of a detectable element having a plate-shaped capsule.
Figure 12:
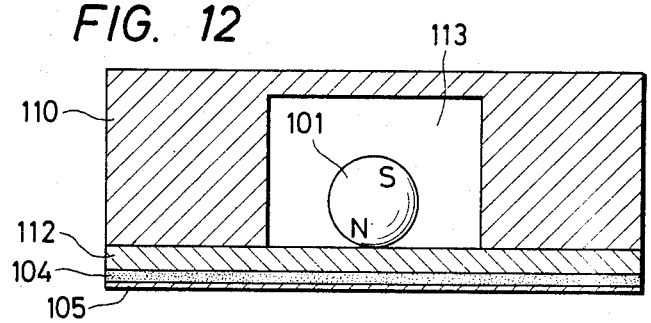
FIG. 12 is a cross-sectional view of a detectable element having another plate-shaped capsule.

A capsule 102 shown in FIG. 11 comprises a plate 110 having a cylindrical through hole 109 and a pair of covers 111, 112 closing the through hole 109, the plate 110 being square, circular, or of other desired shapes. FIG. 12 shows still another capsule 102 composed of a plate 110 having an open bottomed cavity 113 containing the permanent magnet 101 and a cover 112 by which the open bottom of cavity 113 is closed. The detectable elements as illustrated in FIGS. 11 and 12 can serve as price tags with prices printed thereon.

Figure 13:
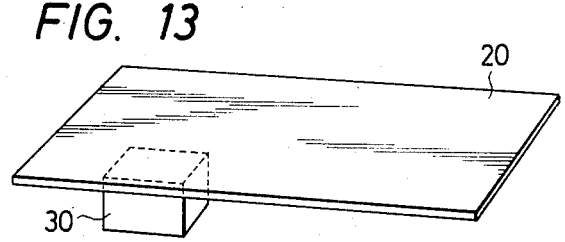
FIG. 13 is a perspective view of a detectable element as attached to a plate-like object.
Figure 14:
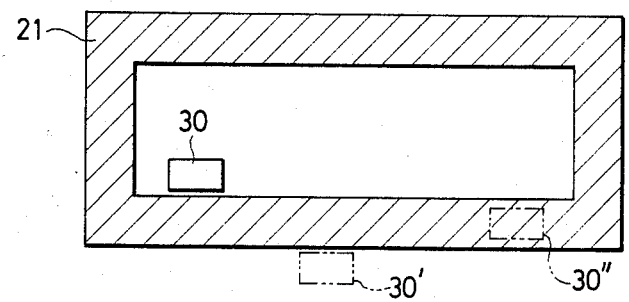
FIG. 14 is a cross-sectional view showing various positions in which the detectable element of the invention can be attached to a package container.
Figure 15:
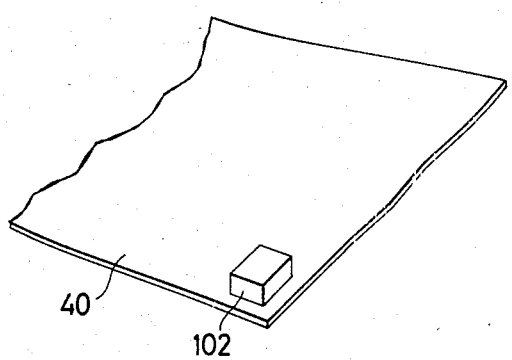
FIG. 15 is a perspective view of a detectable element as applied to a sheet-like object.

The detectable elements as described above are in most cases attached to objects. As shown in FIG. 13, however, a detectable element may be bonded to a sheet-like object such as a price tag, a card, a label, or a decal, and such a sheet-like object may then be attached to other objects such as goods for sale. The sheet-like object may be attached by either being directly applied to the other objects or applying the detectable element 30 to such objects. As shown in FIG. 14, a detectable element 30 may be fixedly mounted in a package 21 for containing an article for sale, or a detectable element 30' may be attached to an outer surface of the package 21, or a detectable element 30'' may be embedded in the package 21. In FIG. 15, a detectable element 102 is formed as an integral part of a thin object 40 such as a sheet, a film, or a plate.

Figure 16:
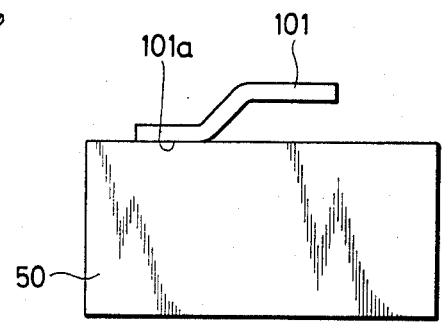
FIG. 16 is a front elevational view of a detectable element incorporating a flexible permanent magnet.

The permanent magnet 101 is not limited to a spherical shape, but may be in the form of a plate, a polyhedral body, or in any other desired shapes. In addition, the permanent magnet 101 may be flexible. The flexible permanent magnet 101 as shown in FIG. 16 is plate- or rod-shaped and has one end 101a fixed to an object 50 the passage or presence of which should be detected. The flexible permanent magnet 101 may comprise a rubber magnet, a plastic magnet, or a paper magnet, for instance. The free end of the permanent magnet 101 is vibratable when placed in an alternating magnetic field.

Figure 17:
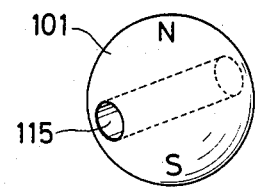
FIG. 17 is a front elevational view of a permanent magnet having a mounting hole.

The permanent magnet 101 may not necessarily be housed in the capsule 102. For example, as shown in FIG. 17, a permanent magnet 101 has a through hole 115 extending diametrically between the north-seeking and south-seeking poles. The permanent magnet 101 with such a through hole 115 may be in other solid shapes than the sphere, and may be magnetized to have a multiplicity of magnetic poles. A thread (not shown) will extend through the through hole 115 for connecting the permanent magnet 101 to an object to be detected for its passage or presence. Although not shown, a solid permanent magnet 101 which may be in any desired shapes may be tied or bonded to a thread, which is connected to an object to be detected. The permanent magnet thus attached to the object is movable when put in an alternating magnetic field.

The permanent magnet 101 of various forms may not be housed in the capsule 102, but may be accommodated in a cavity in an object to be detected so that the permanent magnet 101 can be moved in the cavity.

In the foregoing embodiments, a magnetic wave emanating from the permanent magnet 101 as it moves under an alternating magnetic field is picked up to detect an object to which the permanent magnet is attached. However, an arrangement may be made to detect a sound generated upon movement of the permanent magnet 101 with a microphone. For example, if the capsule 102 as shown in FIGS. 1 and 2 is made of a nonmagnetic material such as copper, brass, aluminum, or porcelain, a sound is produced when the permanent magnet 101 collides with the capsule 102 due to its rotary or vibratory motion under an applied alternating magnetic field, and the sound can be picked up by a microphone for detecting the passage or presence of the detectable element.

Figure 18:
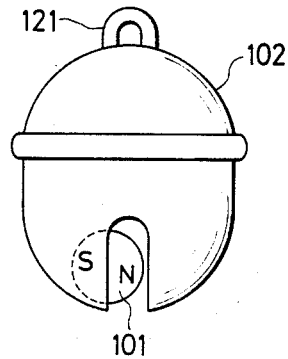
FIG. 18 is a front elevational view of a detectable element constructed as part of a bell.

FIG. 18 shows one such application in which a capsule 102 and a permanent magnet 101 jointly constitute a bell having a ring 121 through which extends a thread (not shown) attached to an object to be detected. When the permanent magnet 101 hits the capsule 102, the capsule 102 emits a resonant sound which is relatively large in intensity.

Figure 19:
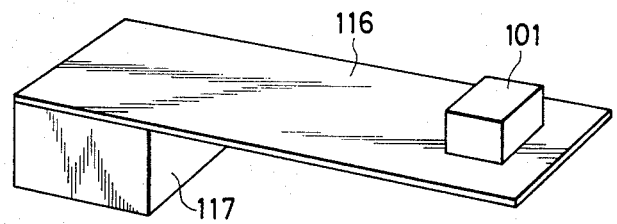
FIG. 19 is a perspective view of a detectable element as attached to a sound-producing body.
Figure 20:
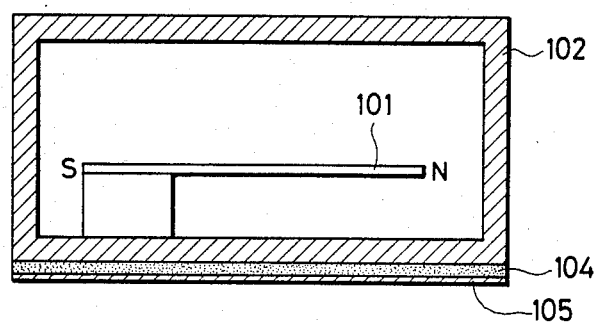
FIG. 20 is a cross-sectional view of a permanent magnet doubling as a sound-producing body.
Figure 21:
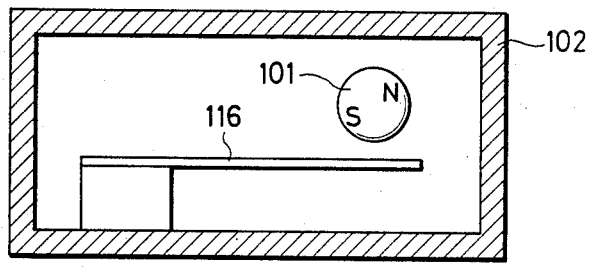
FIG. 21 is a perspective view of a detectable element as combined with a sound-producing body.

As shown in FIG. 19, a bar-shaped vibrator or sound-producing body 116 has one end fixed to a support 117 and supports a permanent magnet 101 on its free end. When the permanent magnet 101 vibrates under an applied alternating magnetic field, the sound-producing body 116 generates a sound for detecting an object with which such a detectable element is associated. In FIG. 20, a sound-producing body 116 may itself be comprised of a permanent magnet 101. According to a still further embodiment as shown in FIG. 21, a sound-producing body 116 is housed in a capsule 102 with one end supported thereon, and a permanent magnet 101 is movably accommodated in the capsule 102. When the permanent magnet 101 is moved in the capsule 102 under an applied alternating magnetic field, the permanent magnet 101 collides with the sound-producing body 116.

Figure 22:
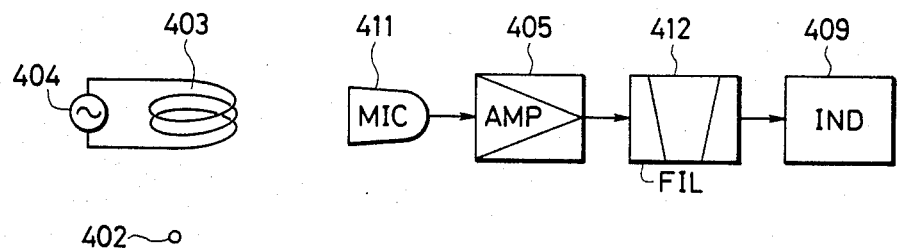
FIG. 22 is a block diagram of a circuit for detecting a sound given off by a detectable element.

As shown in FIG. 22, the sound thus produced can be picked up by a microphone 411 which then generates an output that is amplified by an amplifier 405. An output signal from the amplifier 405 is processed by a filter 412 so as to remove noise signal components. The filter 412 supplies its output to an indicator 409. Where the sound-producing body 116 comprises a vibrator, the filter 412 passes only a signal having a frequency at which the vibrator vibrates.

The detectable element according to the present invention can be attached to an object or a human body to be detected. When the object or human body carrying the detectable element enters a space filled with an alternating magnetic field, the detectable element can reliably be detected even at a relatively long distance without being seriously affected by external magnetic noises or residual magnetism in products of iron. The permanent magnet 101 in the form of a ball is small in size, about 3 mm across, and inexpensive to fabricate. Therefore, the detectable element is less costly to construct. The detectable element or an object to which it is attached may be processed by a demagnetizer used as for magnetic recording tapes to demagnetize the permanent magnet 101 with ease.

Although certain preferred embodiments have been shown and described, it should be understood that many changes and modifications may be made therein without departing from the scope of the appended claims.

What is claimed is:

1. A system for detecting the presence of an object comprising:
   a detectable element including a capsule made of a nonmagnetic material and having a permanent magnet therein which is freely movable within said capsule, said detectable element being attached to the object to be detected;
   means for generating an alternating magnetic field of a predetermined frequency which causes said permanent magnet to move inside said capsule when said detectable element is near said generating means;
   sensor means disposed near said generating means for detecting a magnetic wave emanating from said detectable element upon movement of said permanent magnet, said sensor means being operative to produce an electric signal;
   filter means for extracting from said electric signal a signal component of a frequency which is related to the frequency of said alternating magnetic field but different therefrom; and
   an indicator responsive to said signal component for indicating the presence of the object to be detected.

2. The object detecting system of claim 1 including means for producing an auxiliary alternating magnetic field which substantially cancels out the alternating magnetic field of said first-mentioned generating means at said sensor means.

3. The object detecting system of claim 1 wherein said filter means includes a notch filter operative to reject signal components of said predetermined frequency.

4. The object detecting system of claim 1 wherein said filter means has a passband corresponding to 1/n (n=an integer) of the predetermined frequency of said alternating magnetic field, or of a frequency close to said predetermined frequency.

5. The object detecting system of claim 1 wherein said capsule is made of a flexible material and has an opening slightly smaller than said permanent magnet, said permanent magnet being forcibly pushed into said capsule through said opening.

6. The object detecting system of claim 1 wherein said capsule comprises a plate having a hole therein in which said permanent magnet is disposed.

7. The object detecting system of claim 1 wherein said capsule comprises a sheet-like member having a projecting portion which defines a space in which said permanent magnet is disposed.

8. The object detecting system of claim 1 wherein said capsule has an opening which is closed by the object when said capsule is mounted on the object.

9. The object detecting system of claim 1 wherein said capsule includes an adhesive layer on a surface thereof for attaching said capsule to the object to be detected.

10. A system for detecting the presence of an object comprising:
   a detectable element including a capsule made of a nonmagnetic material and having a permanent magnet therein which is freely movable in said capsule, said detectable element being attached to the object to be detected;
   means for generating an alternating magnetic field of a predetermined frequency which causes said permanent magnet to move inside said capsule when said detectable element is near said generating means, said capsule being operative to produce sounds when said permanent magnet collides with an inner wall of said capsule which sounds include a frequency component characteristic of said capsule;
   a microphone disposed near said generating means and responsive to said sounds for producing an electric signal;
   filter means having a passband corresponding to a frequency of said sounds for extracting from said electric signal a signal component of said capsule frequency characteristic; and
   an indicator responsive to said signal component for indicating the presence of the object to be detected.

* * * * *